(12) United States Patent
Leigh et al.

(10) Patent No.: US 11,294,131 B2
(45) Date of Patent: Apr. 5, 2022

(54) WAVEGUIDE SHUFFLE BLOCKS FOR OPTICAL SYSTEM CONNECTIVITY

(71) Applicant: HEWLETT PACKARD ENTERPRISE DEVELOPMENT LP, Houston, TX (US)

(72) Inventors: Kevin B. Leigh, Houston, TX (US); Everett R. Salinas, Pasadena, TX (US); Sagi Varghese Mathai, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 114 days.

(21) Appl. No.: 16/815,713

(22) Filed: Mar. 11, 2020

(65) Prior Publication Data
US 2021/0286142 A1    Sep. 16, 2021

(51) Int. Cl.
*G02B 6/44*   (2006.01)
*G02B 6/38*   (2006.01)
*G02B 6/28*   (2006.01)

(52) U.S. Cl.
CPC ......... *G02B 6/4403* (2013.01); *G02B 6/2808* (2013.01); *G02B 6/3822* (2013.01); *G02B 6/3829* (2013.01)

(58) Field of Classification Search
CPC .. G02B 6/4403; G02B 6/2808; G02B 6/3822; G02B 6/3929
See application file for complete search history.

(56) References Cited

U.S. PATENT DOCUMENTS

| | | | |
|---|---|---|---|
| 7,663,452 B2 | 2/2010 | Rauscher | |
| 8,077,748 B1 | 12/2011 | Dugan | |
| 9,354,397 B2 | 5/2016 | Bylander | |
| 2003/0169758 A1 | 9/2003 | Lavigne et al. | |
| 2013/0322838 A1* | 12/2013 | Julien | G02B 6/4446 385/135 |
| 2019/0121029 A1 | 4/2019 | Faraj | |

FOREIGN PATENT DOCUMENTS

| | | |
|---|---|---|
| CN | 104238233 | 12/2014 |
| WO | WO-2003016975 | 2/2003 |

* cited by examiner

*Primary Examiner* — Sung H Pak
*Assistant Examiner* — Hoang Q Tran
(74) *Attorney, Agent, or Firm* — Nolte Lackenbach Siegel

(57) ABSTRACT

A shuffle assembly for a computing device comprises at least one chassis waveguide shuffle block having a plurality of chassis inputs and a plurality of chassis outputs, and having a plurality of optical waveguides formed therein connecting the chassis inputs to the chassis outputs in a desired chassis shuffle arrangement. The shuffle assembly may further comprise at least one line card waveguide shuffle block having a plurality of line card inputs, at least one of the plurality of line card inputs, a plurality of line card outputs, and a plurality of waveguides formed therein connecting the plurality of line card inputs to the plurality of line card outputs in a line card shuffle arrangement. At least one optical ribbon cable may couple the at least one chassis waveguide shuffle block to the at least one waveguide shuffle block.

14 Claims, 15 Drawing Sheets

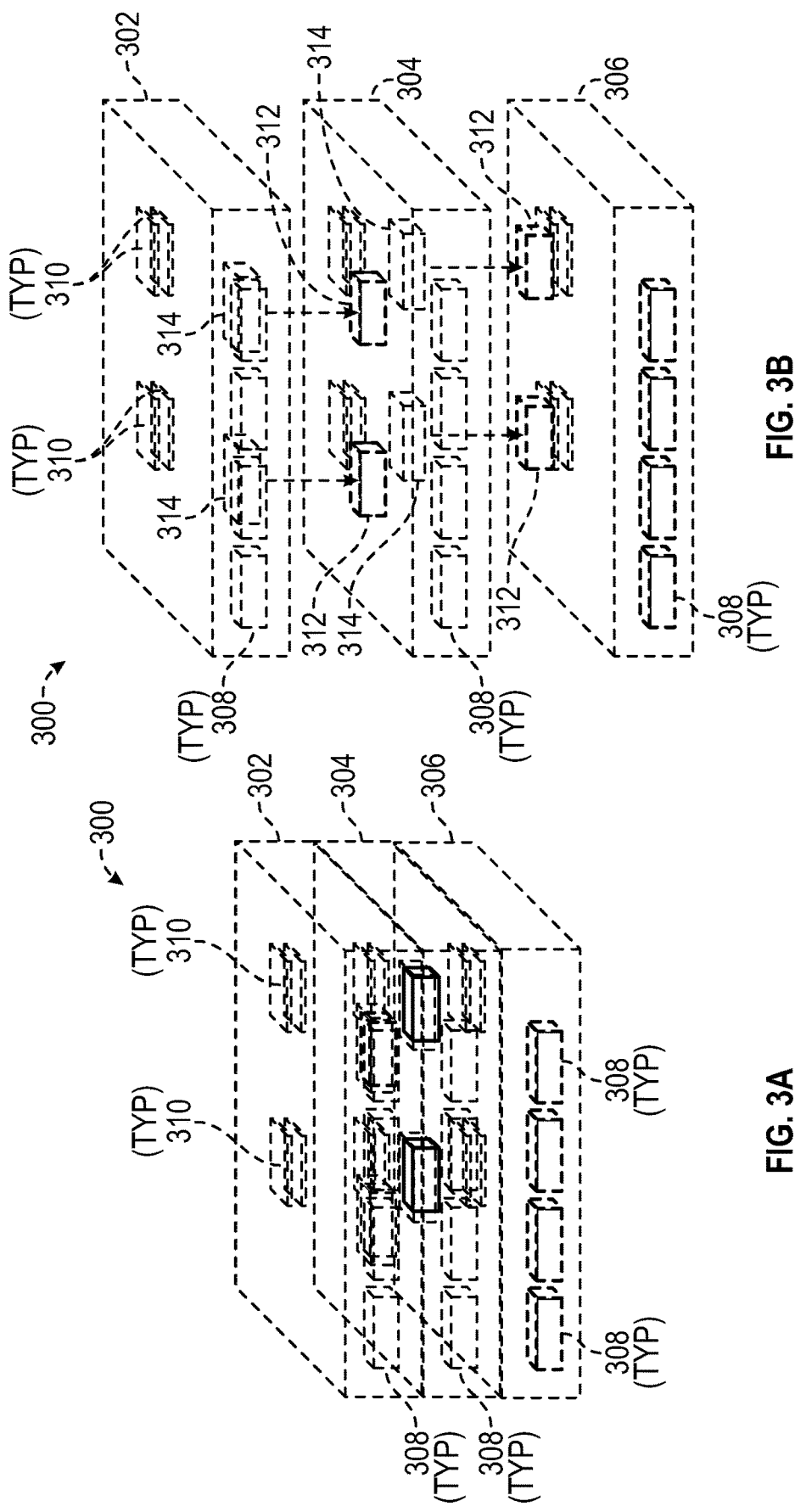

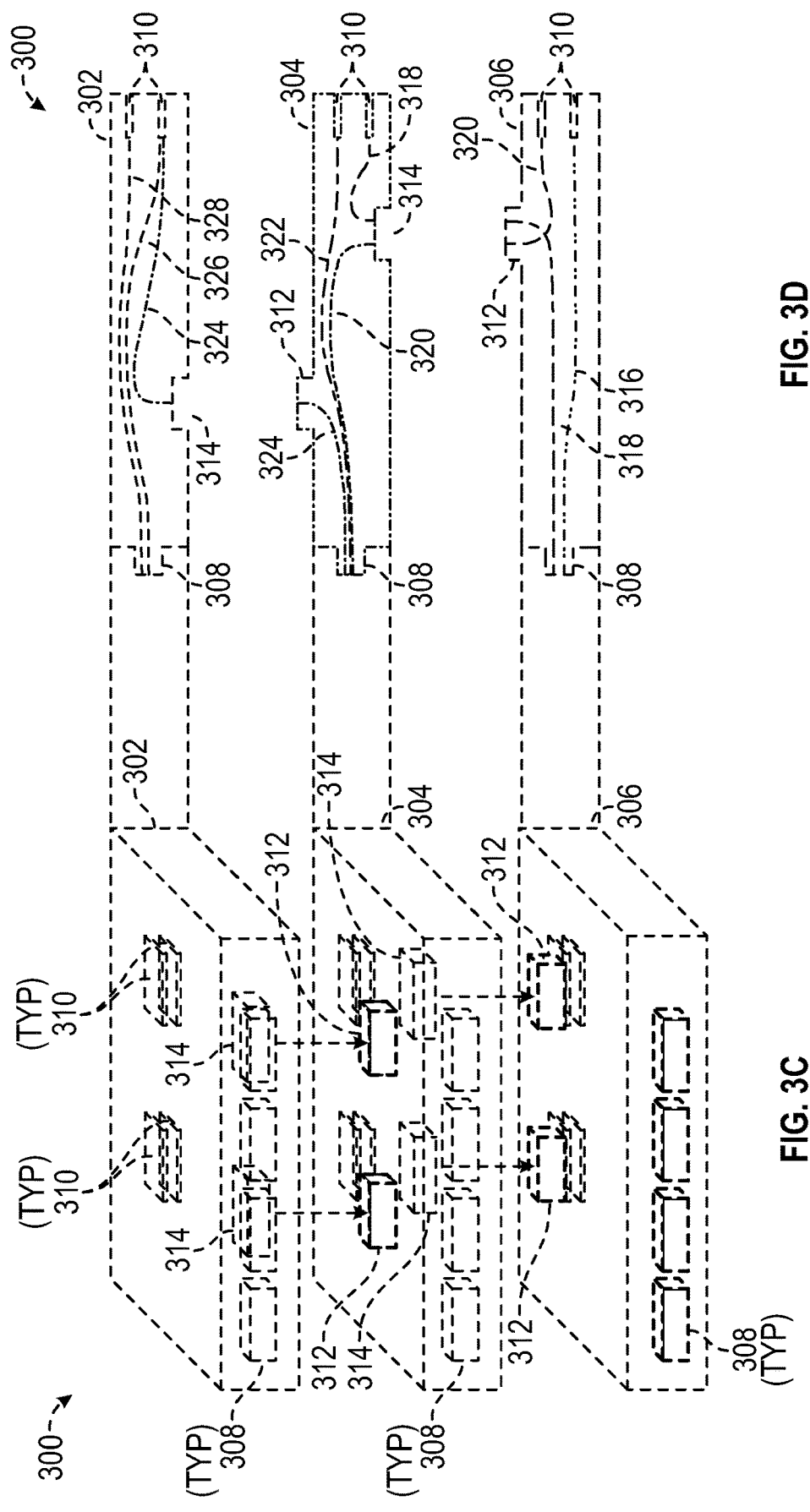

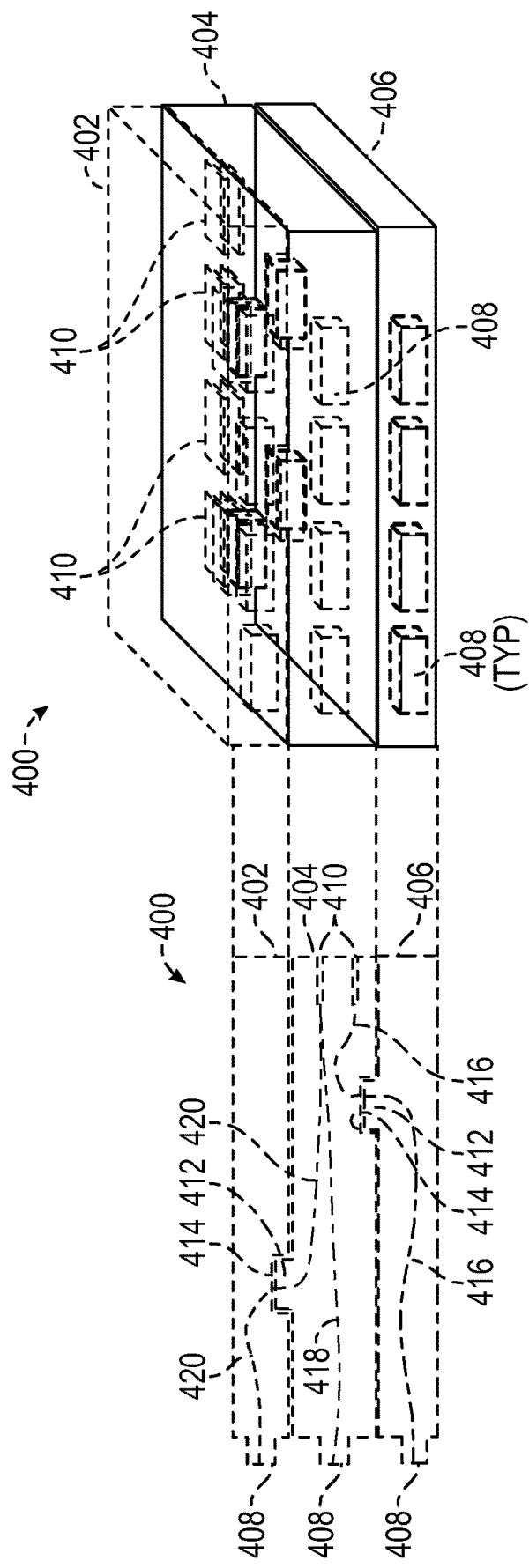

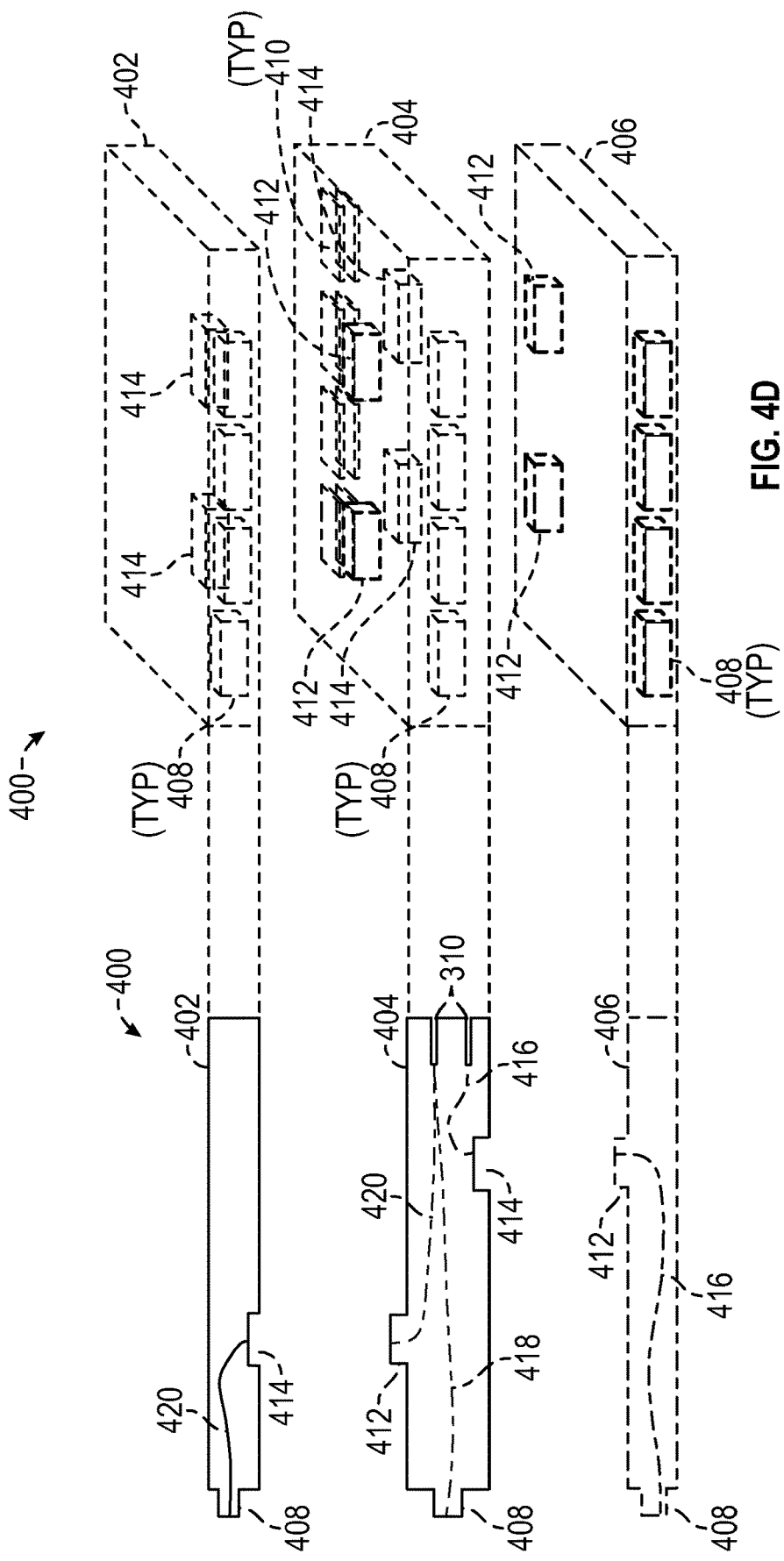

WAVEGUIDE SHUFFLE BLOCKS FOR OPTICAL SYSTEM CONNECTIVITY

BACKGROUND

Modern datacenters employ optical transceivers and fibers for high bandwidth connections. Optical transmitters take electrical signals and encode them into optical signals that are carried over optical fibers to optical receivers that reproduce the electrical signals and the information they carry. An optical fiber may transport one or multiple wavelengths, where each wavelength is a modulated sequences of optical signals. Optical cables may include multiple optical fibers. Optical fiber connections are also used to connect different chassis or systems together in a network.

Optical fiber shuffles may be employed to cross-connect fibers from multiple inputs to reconfigured outputs. Optical fiber shuffles may be used to simplify manual cabling among computing systems, especially for large interconnect fabrics. Optical fiber shuffles may involve shuffle boxes for in-rack connectivity, and shuffle racks for in-row connectivity. Systems may integrate optics within systems where in-system fiber shuffles are used.

BRIEF DESCRIPTION OF THE DRAWINGS

The present disclosure is best understood from the following detailed description when read with the accompanying figures, wherein:

FIG. 3A is a perspective view of a chassis waveguide shuffle block according to one example;

FIG. 3B is an exploded perspective view of the chassis waveguide shuffle block of FIG. 3A;

FIG. 3C is an exploded perspective view of the chassis waveguide shuffle block of FIG. 3A;

FIG. 3D is an exploded side view of the chassis waveguide shuffle block of FIG. 3A;

FIG. 4A is a side view of a chassis waveguide shuffle block in accordance with one example FIG. 4B is a perspective view of the chassis waveguide shuffle block of FIG. 4A;

FIG. 4C is an exploded side view of the chassis waveguide shuffle block of FIG. 4A;

FIG. 4D is an exploded perspective view of the chassis waveguide shuffle block of FIG. 4A;

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Figure 1:
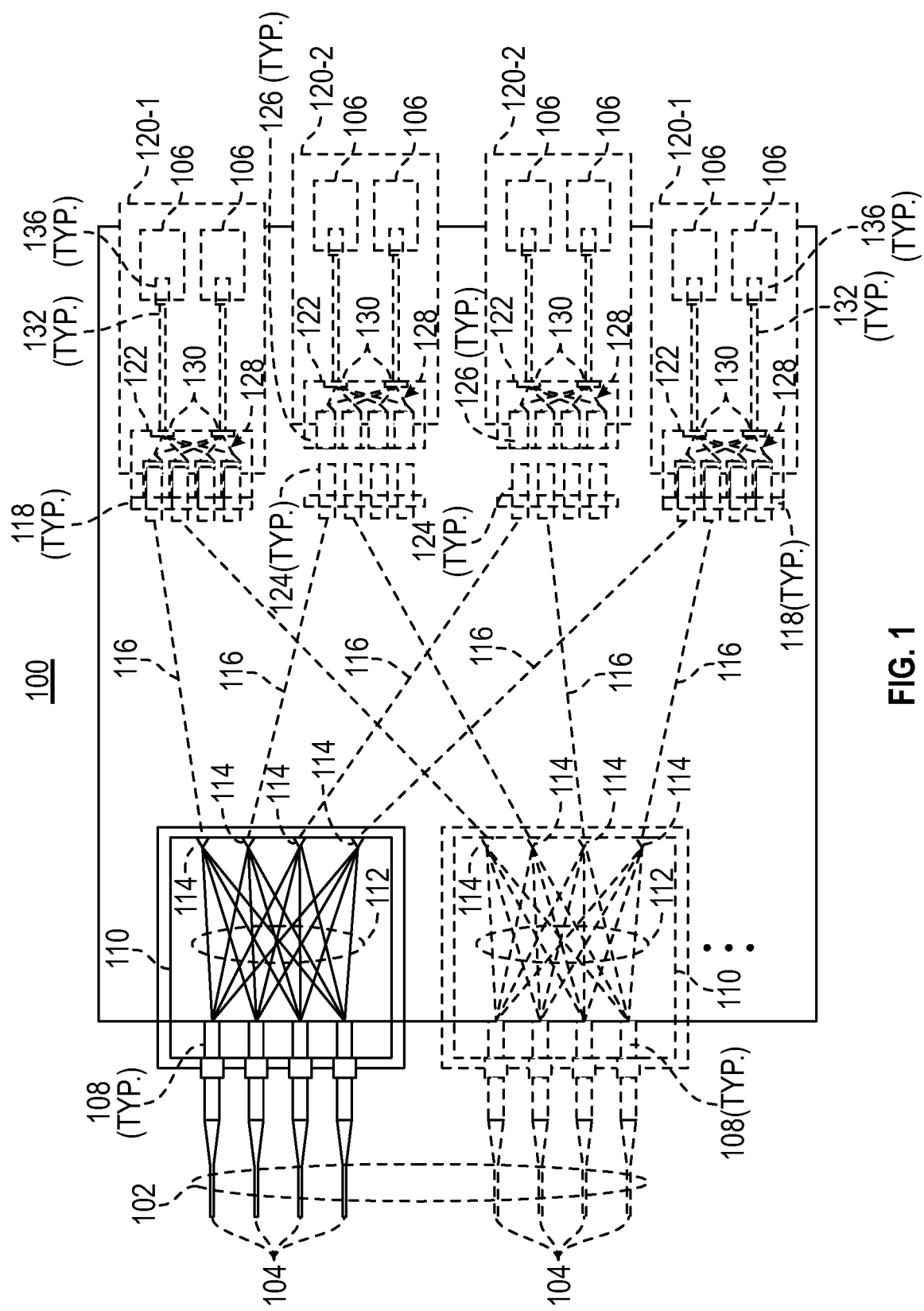
FIG. 1 is a block diagram of a waveguide shuffle assembly according to one example.

FIG. 1 is a block diagram of a shuffle assembly 100 for a computing device. Shuffle assembly 100 accepts a plurality of chassis inputs 102 which are directed to a plurality of line card output circuits 106. In various examples, each of the plurality of chassis inputs 102 comprises an optical fiber cable 104, and each line card output circuit 106 presents a plurality of electrical signals. Each optical fiber cable may comprise a plurality of optical fibers. The example of FIG. 1 shows representative number of optical fiber cables and a corresponding number of line card output circuits 106, as hereinafter described. It is to be understood that various examples may incorporate greater or fewer numbers of inputs and outputs.

In some examples, each optical fiber cable may comprise a plurality, e.g., sixteen, optical fibers. As shown in FIG. 1, in this example each optical fiber cable is received within connector interface structure 108, which may be, for example, a mechanical transfer (MT) ferrule connector interface. Connector interface structures 108 align the individual optical fibers of each optical fiber cable 104 relative to a chassis waveguide shuffle block 110.

In this example, each chassis waveguide shuffle block 110 comprises a either a monolithic or cascaded waveguide block, as described herein. Each chassis waveguide shuffle block 110 has a plurality of waveguides 112 formed therein, with the plurality of waveguides 112 connecting each optical fiber within the plurality of optical fiber cables 104 in a desired chassis shuffle arrangement with a plurality of output interfaces 114. In examples, each output interface 114 comprises a V-groove fiber termination for interfacing with a plurality of optical fibers.

With continued reference to FIG. 1, an optical fiber ribbon cable 116 extends from each output interface 114 and connects to corresponding ferrule 124 that are housed within corresponding connector structures 118 of a plurality of line cards 120-1, 120-2. In examples, connector structures 118 may be blindmate ferrule connector housings which align each ferrule 124 and receptacle 126 in a way that plurality of optical fiber positions in each optical fiber ribbon cable 116 with optical interfaces of a plurality of line card inputs will have proper optical signal coupling. One or both of each ferrule 124 and receptacle 126 may further incorporate a lens (not shown) for focusing optical signals through connector structures 118.

A shuffle unit (for example, line card waveguide shuffle block 122) is provided to connect optical signals from ribbon cables 116 to a plurality of output interfaces 130 in a desired line card shuffle arrangement. In some examples, the desired line card shuffle arrangement may be implemented using a plurality of individual fibers coupled between line card connector structures 118 and the plurality of output interfaces 130.

In the example of FIG. 1, each connector structure 118 may comprise a ferrule 124 received within a receptacle 126 of a line card waveguide shuffle block 122. In the example of FIG. 1, line cards 120-1 are shown with ferrules 124 fully inserted into receptacles 126, while line cards 120-2 are shown prior to insertion of ferrules 124 into receptacles 126.

As shown in FIG. 1, each line card waveguide shuffle block 122 has a plurality of waveguides 128 formed therein, with the plurality of waveguides 128 optically coupling each optical fiber within optical fiber ribbon cables 116 in a desired line card shuffle arrangement with a plurality of output interfaces 130. Each line card waveguide shuffle block 122 comprises either a monolithic (i.e., one-piece) waveguide block or cascaded waveguide blocks, as described herein. Output interfaces 130 may comprise V-groove interfaces for the fiber ribbon cable 132 to be attached to. Each output interface 130 may connect to a fiber ribbon cable 132 connected to a line card output circuit 106 via a chip connector 136, such as a chip ferrule connector. Line card output circuits 106 may be implemented as one or more application-specific integrated circuits (ASICs) for converting optical signals to electrical logic signals. Line card output circuits 106 may perform application specific functions such as network packet switching, network circuit switching, processor, accelerator, etc.

Figure 2:
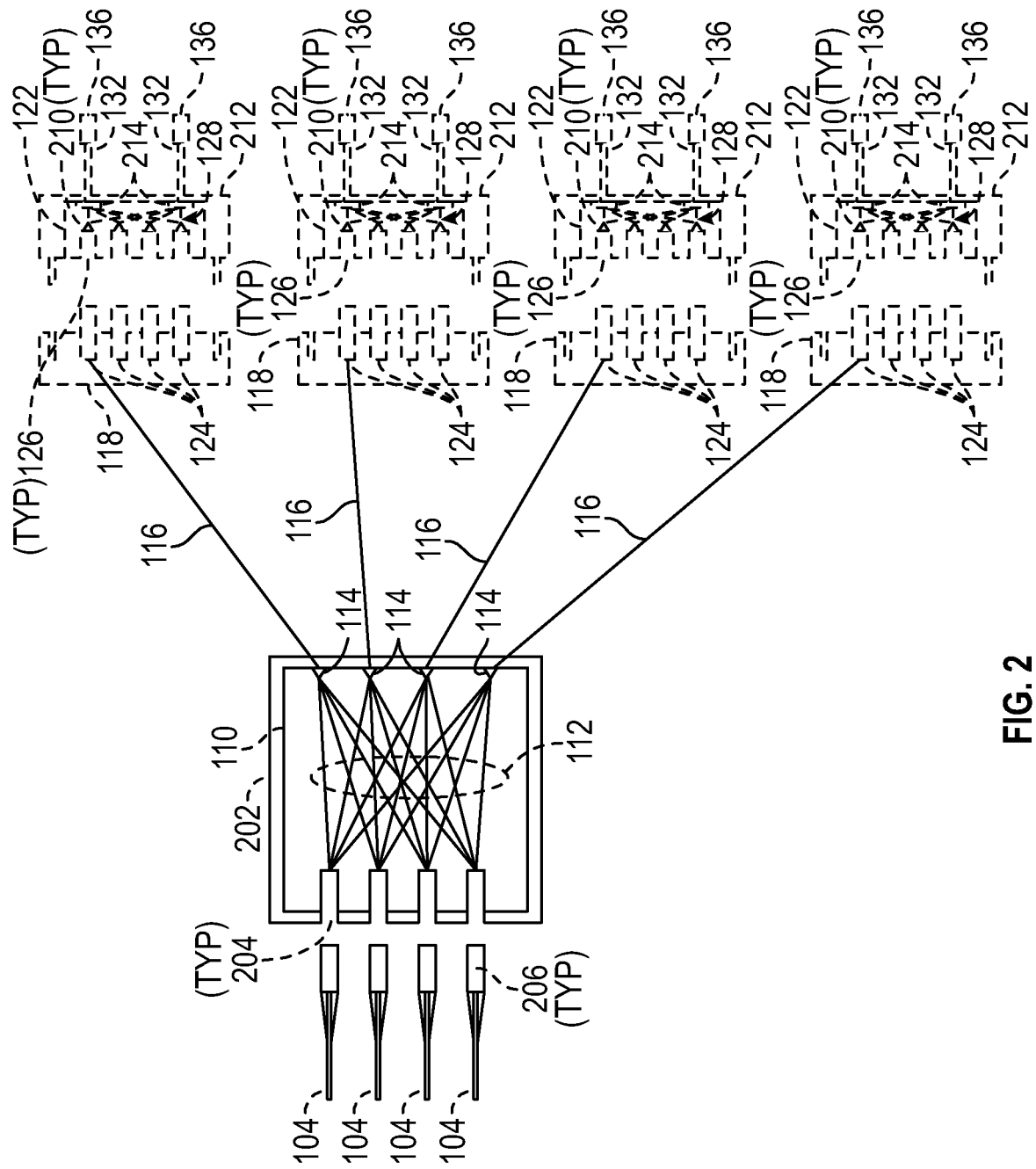
FIG. 2 is a block diagram showing interconnection of elements within the waveguide shuffle assembly of FIG. 1.

As shown in FIG. 2, a chassis waveguide shuffle block 110 in shuffle assembly 100 may be encased within a housing 202 having receptacles 204 therein for receiving optical fiber cables 104, which as previously noted may be off-the-shelf multi-fiber cables having connectors 206. In some examples, connectors may be multi-fiber push-on (MPO) connectors. Output interfaces 114, which as noted may be V-groove connections are provided to for connecting optical fiber ribbon cables 116 to corresponding ferrules 124 within connector structures 118.

Connector structures 118 may be adapted to mate with a plurality of receptacles 126 of line card waveguide shuffle blocks 122 having lenses 210. Line card waveguide shuffle blocks 122 may have housings 212. Waveguides 128 formed within line card waveguide shuffle blocks 122 may terminate with V-groove connections for connection to fiber ribbon cables 132 each having a chip connector 136 (e.g., a chip ferrule) for connection to a line card output circuit 106 (e.g., ASIC).

Turning to FIGS. 3A and 3B, there is shown an example of a waveguide shuffle block 300 which may be suitable for use in a shuffle assembly such as shuffle assembly 100 or shuffle assembly 122 in the example of FIGS. 1 and 2. Chassis waveguide shuffle block 300 in the example of FIGS. 3A and 3B has a cascaded structure and includes individual top, middle and bottom waveguide blocks 302, 304, and 306, respectively. FIG. 3A is a perspective view of a stack of waveguide blocks 302, 304, and 306; FIG. 3B is an exploded perspective view of waveguide blocks 302, 304, and 306. Each waveguide block 302, 304, and 306 may be a monolithic glass block having one or more embedded waveguides formed therein, for example using three-dimensional focused laser-writing techniques.

In the example of FIGS. 3A and 3B, each waveguide block 302, 304, 306 has a plurality of input connectors 308 on a face thereof. Input connectors 308 may be mechanical transfer (MT) ferrule connector interfaces, aligning the individual optical fibers of optical fiber cables (not shown in FIGS. 3A and 3B) relative to respective waveguide blocks 302, 304, 306. In addition, In the example of FIGS. 3A and 3B, each waveguide block 302, 304, 306 has a plurality of output connectors 310, which may be V-groove fiber terminations for coupling with ribbon cables (not shown in FIGS. 3A and 3B) connecting respective waveguide blocks 302, 304, 306 to connector structures 118, as described with reference to the example of FIGS. 1 and 2.

With continued reference to FIGS. 3A and 3B, waveguide blocks 302, 304, and 306 each have one or more inter-block waveguide array interfaces comprising interface plugs 312 from the monolithic structures and interface sockets 314 within the monolithic structures, as described herein. In other examples, mechanical and optical alignment between cascaded waveguide blocks such as waveguide blocks 302, 304. And 306, may be accomplished by other means, such as with mechanical pin-and-socket structures. Lens arrays may also incorporated in some examples to form interblock waveguide array interfaces. In various examples, the inter-block waveguide array interfaces enable embedded waveguides to be routed among the individual waveguide blocks 302, 304, 306.

FIGS. 3C and 3D are side and perspective views, respectively, of chassis waveguide shuffle block 300 from FIGS. 3A and 3B, comprising a cascaded arrangement of individual monolithic waveguide blocks 302, 304, and 306 having mating inter-block waveguide array interfaces comprising interface plugs 312 and interface sockets 314. As shown particularly in FIG. 3C, a plurality of embedded waveguides 316, 318, 320, 322, 324, 326, and 328 are routed through and/or among waveguide blocks 302, 304 and 306. For example, embedded waveguide 316 extends between input connector 308 of waveguide block 306 and an output connector 310 of waveguide block 306. Embedded waveguide 318 extends from an input connector 308 of waveguide block 306 to an inter-block interface plug 312 of waveguide block 306. Embedded waveguide 318 continues through an inter-block interface socket 314 of middle waveguide block 304 and extends to an output connector 310 of waveguide block 304.

Similarly, embedded waveguide 320 in middle waveguide block 304 extends from an input connector 308 of waveguide block 304 to inter-block interface socket 314 of waveguide block 304. Embedded waveguide 320 then extends between inter-block interface plug 312 of waveguide block 306 to an output connector 310 of waveguide block 306.

With continued reference to the example of FIGS. 3C and 3D, embedded waveguide 322 extends between an input connector 308 of middle waveguide block 304 and an output connector 310 of waveguide block 304. Embedded waveguide 324 extends from an input connector 308 of middle waveguide block 304 to an inter-block interface plug 312 of middle waveguide block 304. Embedded waveguide 324 then extends from an inter-block interface socket 314 of top waveguide block 302 to an output connector 310 of waveguide block 302. Embedded waveguides 326 and 328 each extend between an input connector 308 of top waveguide block 302 and an output connector 310 of top waveguide block 302.

Turning to FIGS. 4A and 4B, there is shown another example of a chassis waveguide shuffle block 400 which may be suitable for use in a shuffle assembly such as shuffle assembly 100 in the example of FIGS. 1 and 2. Chassis waveguide shuffle block 400 in the example of FIGS. 4A and 4B has a cascaded structure and includes individual top, middle and bottom waveguide blocks 402, 404, and 406, respectively. FIG. 4A is a side view of a cascaded stack of waveguide blocks 402, 404, and 406; FIG. 4B is a perspective view of the cascaded stack of waveguide blocks 402, 404, and 406. Each waveguide block 402, 404, and 406 may be a monolithic glass block having one or more embedded waveguides formed therein, for example using three-dimensional focused laser-writing techniques.

In the example of FIGS. 4A and 4B, each waveguide block 402, 404, 406 has a plurality of input connectors 408. Input connectors 408 may be mechanical transfer (MT) ferrule connector interfaces, aligning the individual optical fibers of optical fiber cables (not shown in FIGS. 4A and 4B) relative to respective waveguide blocks 402, 404, 406. In addition, in the example of FIGS. 4A and 4B, middle waveguide block 404 has a plurality of output connectors 410, which may be V-groove fiber terminations for coupling with ribbon cables (not shown in FIGS. 4A and 4B) connecting waveguide block 404 to line cards, as described with reference to the example of FIGS. 1 and 2.

With continued reference to FIGS. 4A and 4B, waveguide blocks 402, 404, and 406 each have one or more inter-block waveguide array interfaces comprising interface pins 412 from the monolithic structures and mating interface sockets 414 within the monolithic structures, as described herein. The inter-block waveguide array interfaces enable embedded waveguides to be routed among the individual waveguide blocks 402, 404, 406.

FIGS. 4C and 4D are exploded side and perspective views, respectively, of chassis waveguide shuffle block 400 from FIGS. 4A and 4B, comprising a cascaded arrangement of individual monolithic waveguide blocks 402, 404, and 406 having mating inter-block waveguide array interfaces comprising interface plugs 412 and interface sockets 414. As shown particularly in FIGS. 4A and 4C, a plurality of embedded waveguides 416, 418, and 420 are routed through and/or among waveguide blocks 402, 404 and 406. For example, embedded waveguide 416 extends from input connector 408 of waveguide block 406 to an inter-block interface plug 412 of waveguide block 406. Embedded waveguide 416 continues through an inter-block interface socket 414 of middle waveguide block 404 and extends to an output connector 410 of middle waveguide block 404.

Embedded waveguide 418 extends between an input connector 408 of middle waveguide block 404 to an output connector 410 of middle waveguide block 404.

Embedded waveguide 420 extends from an input connector 408 of top waveguide block 402 to an inter-block interface socket 414 of top waveguide block 402. Embedded waveguide 420 then connects to an inter-block interface plug 412 of middle waveguide block 404 and extends to an output connector 410 of middle waveguide block 404.

Figure 5B:
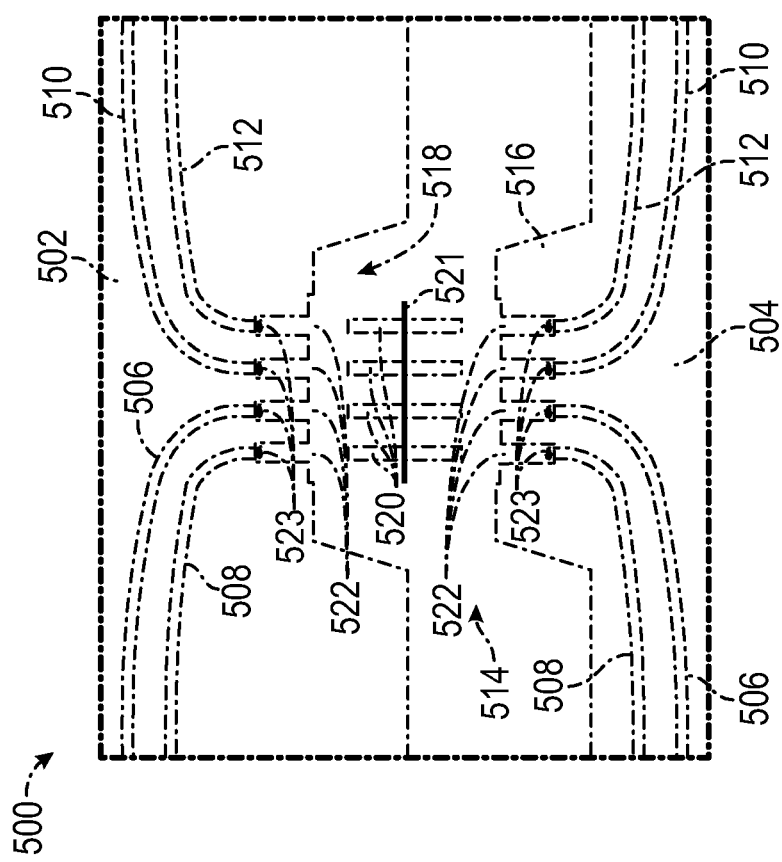
FIG. 5B is an exploded side view of the inter-block interface of FIG. 5A.
Figure 5A:
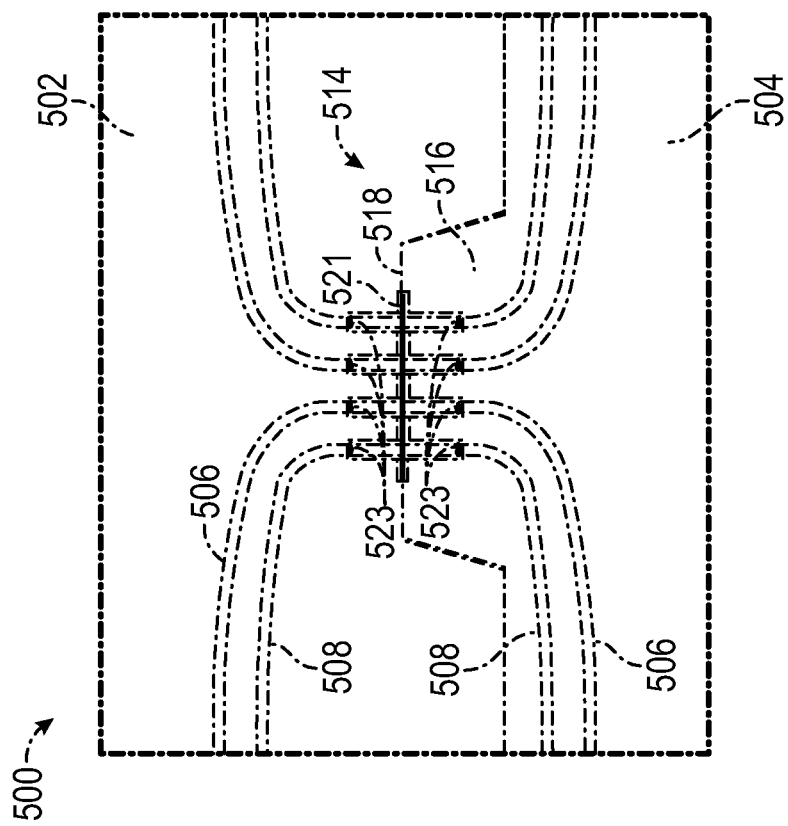
FIG. 5A is a side view of an inter-block interface in a chassis waveguide shuffle block according to one example.

FIGS. 5A and 5B show an example of an inter-block interface 500. Inter-block interfaces may be used between adjacent blocks of a cascaded arrangement of waveguide blocks such as those shown in the examples of FIGS. 3A-3D and FIGS. 4A-4D. In each of FIGS. 5A and 5B, a pair 502 and 504 of monolithic waveguide blocks are depicted. In FIGS. 5A and 5B, a plurality of embedded waveguides 506, 508, 510, and 512 are formed and extend within waveguide blocks 502 and 504. FIG. 5A depicts waveguide blocks 502 and 504 engaged at an inter-block interface 514 comprising an inter-block interface plug 516 on waveguide block 504 and a mating inter-block interface socket 518 in waveguide block 502.

In one example, a plurality of waveguide stubs 520 are disposed within holes 522 formed into inter-block interface plug 516 and inter-block interface socket 518. A waveguide stub 520 may be an optical ferrule with an optical fiber. An array of waveguide stubs may be held together with a retainer plate 521. Retainer plate 521 may have alignment features (not shown) such as metal pins to engage with holes 522. In some examples, lenses 523 may be provided at respective ends of stubs 522 to enhance optical coupling. Waveguide stubs 520 may accommodate tolerance variations in the fabrication and alignment of waveguide blocks 502 and 504. In other examples, stubs 520 may be made of a softer material than glass, and may be enclosed within a ferrule, to allow stubs 520 to be slightly deformed (e.g., bent) within holes 522 without affecting endface contact areas.

Figure 6:
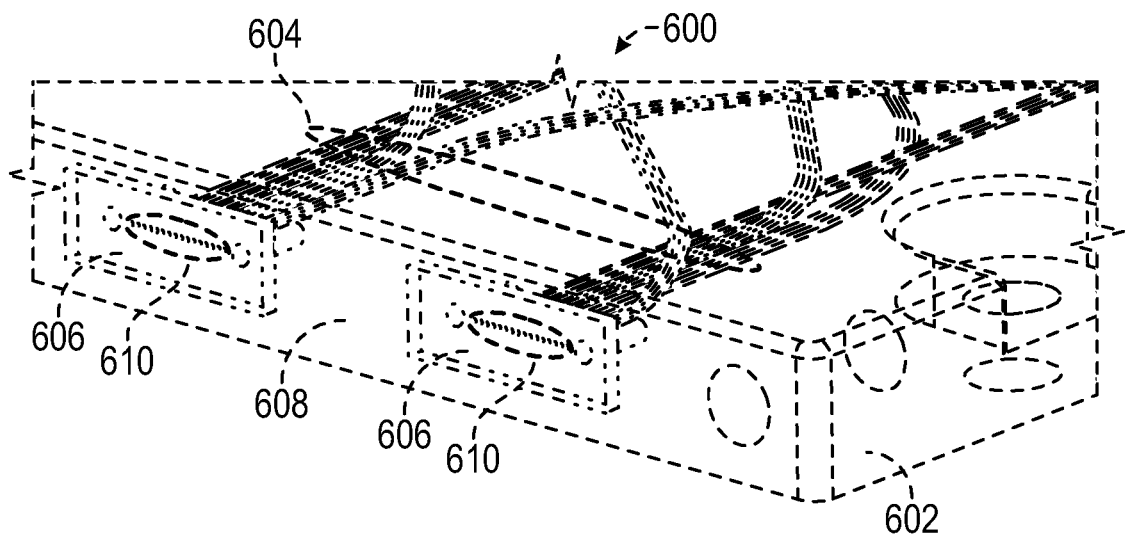
FIG. 6 is a perspective view of a chassis waveguide shuffle block in accordance with one example.

FIG. 6 is a perspective view of a portion of a chassis waveguide shuffle block 600 in accordance with one example. Chassis waveguide shuffle block 600, which may be used in a shuffle assembly such as shuffle assembly 100 in the example of FIG. 1, is shown unencased in FIG. 6. In the example of FIG. 6, waveguide shuffle block comprises a monolithic waveguide block 602 having a plurality of waveguides 604 formed therein. Waveguide block 602 may be made of glass of a composition which enables internal three-dimensional waveguides 604 to be formed therein, such as by using focused lasers to alter the refractive properties of the glass in desired three-dimensional waveguide patterns within waveguide block 602. The end tips of the waveguides 604 are arranged as waveguide interface endface 610 within the connector structure 606. In other examples, waveguide block 602 may be a cascaded stack of glass blocks, such as described with reference to FIGS. 3A-D and 4A-D.

With continued reference to FIG. 6, in this example a pair of mechanical transfer (MT) ferrule interface structures 606 are disposed on a face 608 of waveguide block 602. MT ferrule interface structures 606 provide for alignment of multi-fiber optical cables (not shown in FIG. 6) with face 608 of internal three-dimensional waveguides 604 within waveguide block 602.

Figure 7:
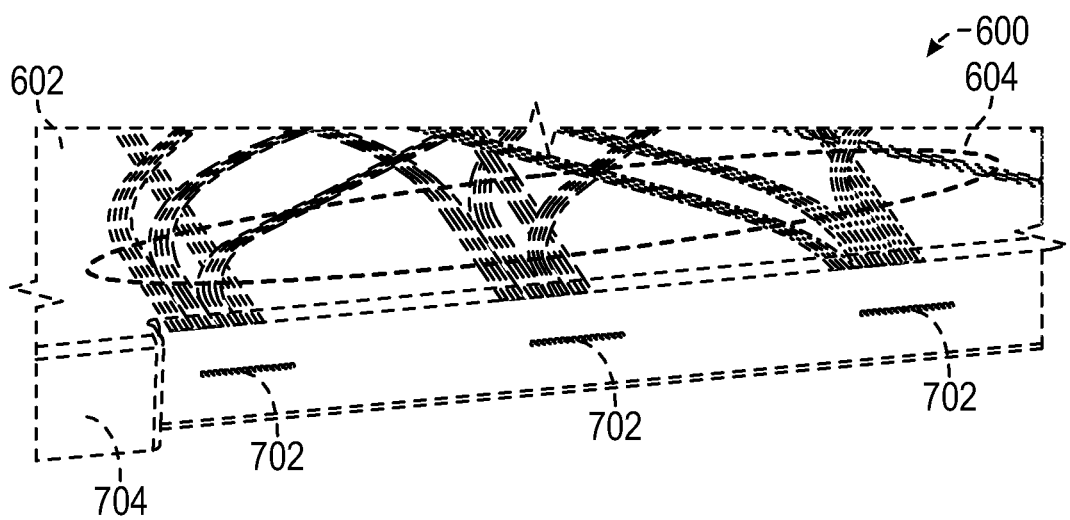
FIG. 7 is a perspective view of the chassis waveguide shuffle block in the example of FIG. 6.

FIG. 7 is a perspective view of a portion of the unencased chassis waveguide shuffle block 600 from the example of FIG. 6, including waveguide block 602 an internal three-dimensional waveguides 604 formed therein. As shown in FIG. 7, a plurality of V-groove interfaces 702 are provided on a face 704 of waveguide block 602, providing for alignment of fiber ribbon cables (not shown in FIG. 7) with endpoints of internal three-dimensional waveguides 604. In some examples, the face 608 and the face 704 may face opposite to each other of the waveguide block 602. In other examples, the face 608 may be situated orthogonal with respect to the face 704 on the waveguide block 602.

Figure 8:
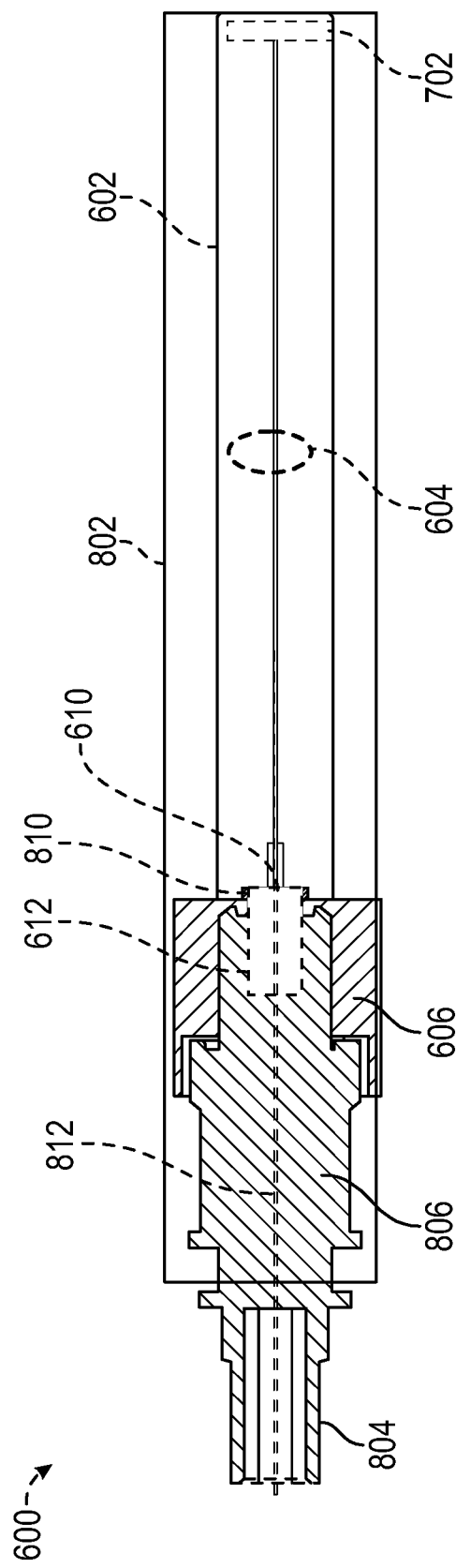
FIG. 8 is a side cross-sectional view of the chassis waveguide shuffle block in the example of FIG. 6.

FIG. 8 is a side cross-sectional side view of chassis waveguide shuffle block 600 from the example of FIG. 6. As illustrated in FIG. 8, an encasement 802 (not shown in FIG. 6) may be provided around waveguide block 602. Also shown in FIG. 8 is a multi-fiber optical cable 804 with a multi-fiber push-on (MPO) plug connector 806 engaged with MPO receptacle housing 606. An MPO plug connector 806 comprises an MT ferrule 612 that terminates an array of fibers 812 and exposes the end tips of the fibers 812 on the endface of the MT ferrule 612. MPO plug connector 806 mechanically couples with MPO receptacle 606, allowing MT ferrule 612 to mechanically couple with MT ferrule interface structure 810 in order for the end tips of fibers 812 in MT ferrule 612 to be aligned with the waveguide interface endface 610 of the waveguide block 602. In an example the endface of ferrule 612 and waveguide interface endface 610 may physically contact. In other examples, there may be an air gap between the endface of MT ferrule 612 and waveguide interface endface 610. Yet in other examples, lenses may be disposed on the endface of ferrule 612 and waveguide interface endface 610. In other examples, plug and receptacle pairs of different connector types than MPO, and different ferrule type than MT, may be used. Multiple multi-fiber optical cables 804 may be connected to other systems.

Figure 9:
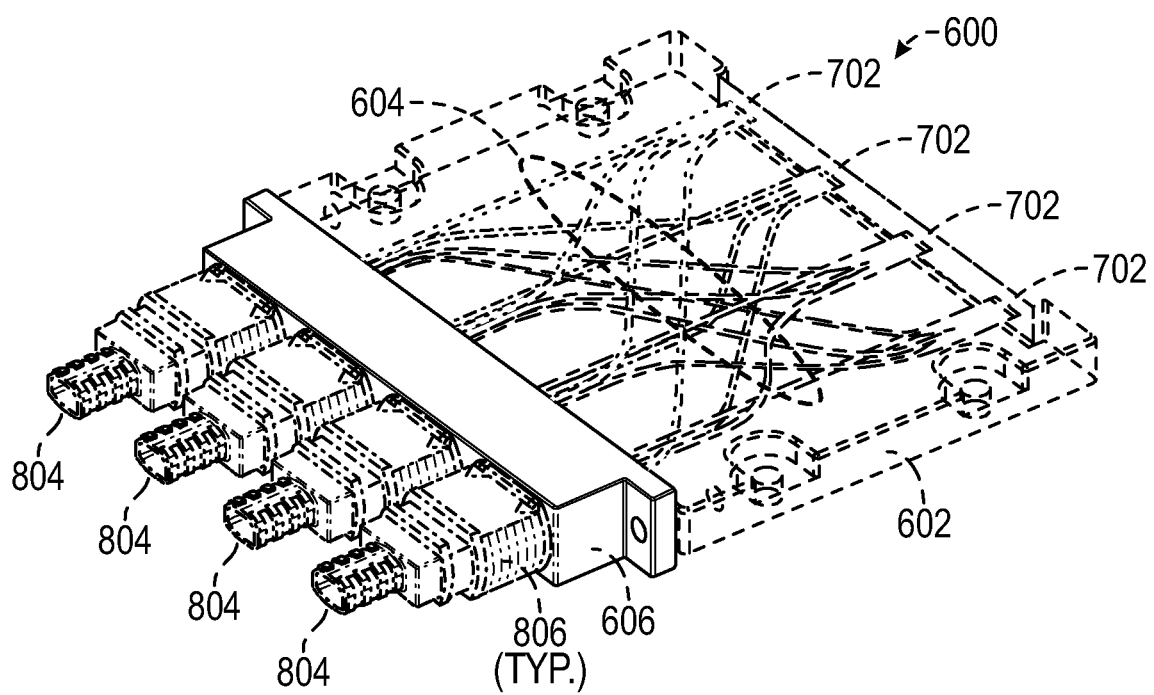
FIG. 9 is a perspective view of the chassis waveguide shuffle block in the example of FIG. 6.
Figure 10:
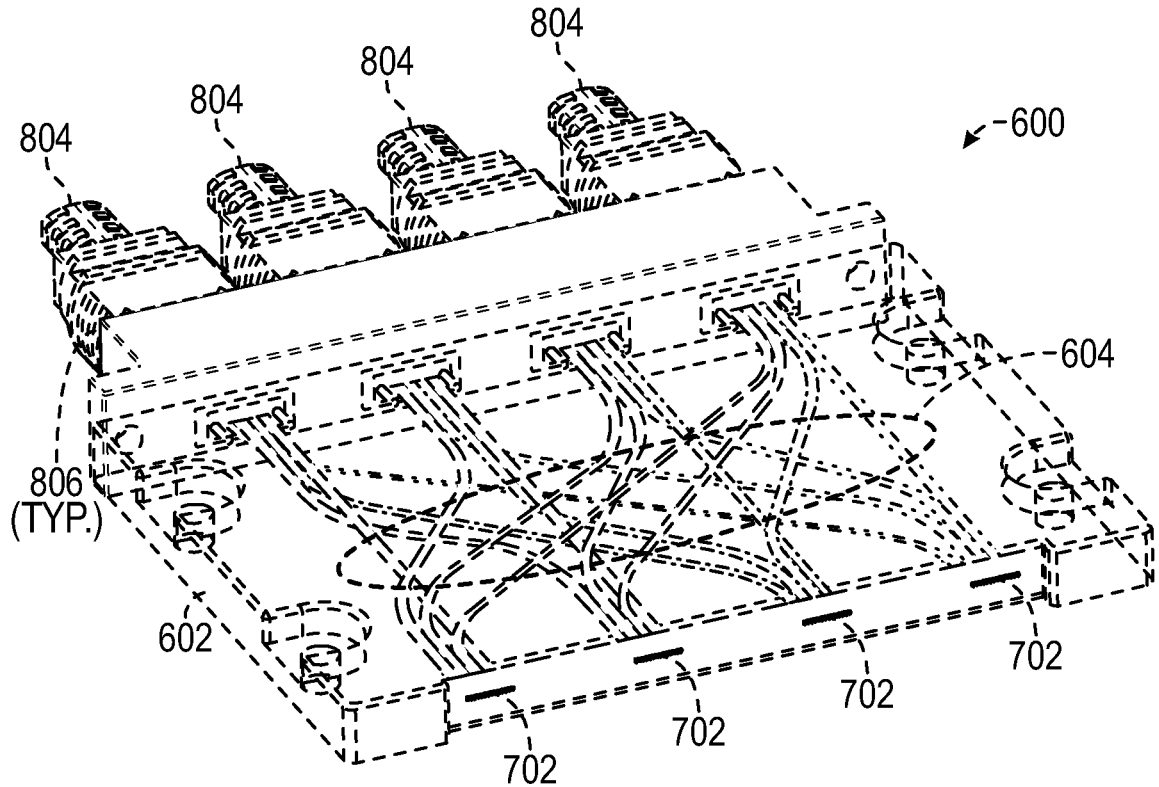
FIG. 10 is a perspective view of the chassis waveguide shuffle block in the example of FIG. 6.

FIGS. 9 and 10 are perspective views of chassis waveguide shuffle block 600 from the example of FIG. 6. (Again, for illustration, no encasement for waveguide block 602 is shown in FIGS. 9 and 10). In FIGS. 9 and 10, a plurality of multi-fiber optical cables 804 having MPO plug connectors 806 are engaged with MPO receptacle connector structure 810 for alignment of the multiple fibers within MPO plug connectors 806 with internal three-dimensional waveguides 604 defined within waveguide block 602. The opposing ends of each of the internal three-dimensional waveguides 604 terminate at V-groove interfaces 702.

Figure 11:
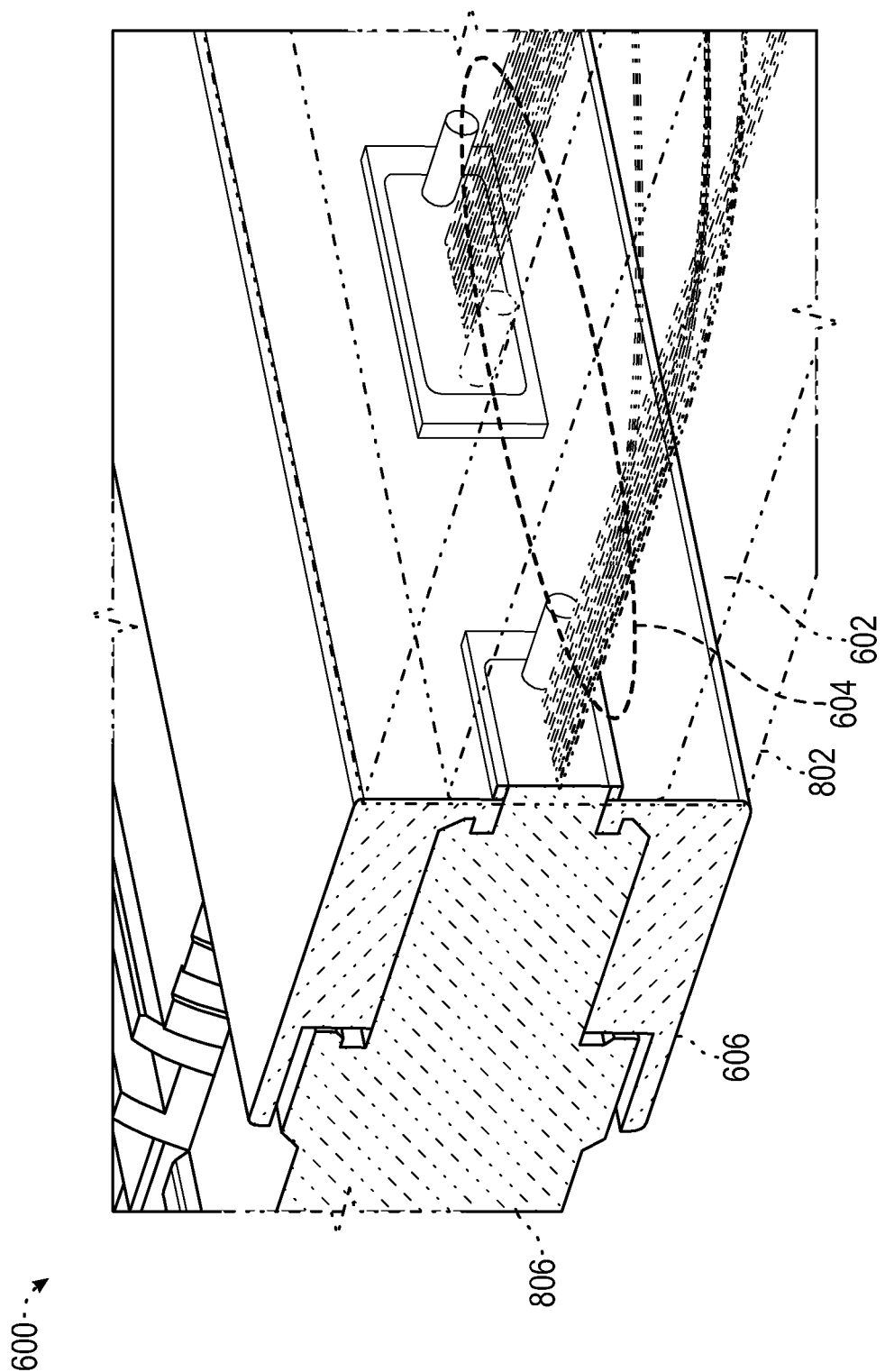
FIG. 11 is a perspective view of a portion of the chassis waveguide shuffle block in the example of FIG. 6.

FIG. 11 is an enlarged perspective detail of a portion of chassis waveguide shuffle block 600 from the example of FIG. 7. In FIG. 11, an MPO plug connector 806 is engaged within MPO receptacle connector structure 810 for alignment of fibers within MPO plug connector 806 (not shown in FIG. 11) with internal three-dimensional waveguides 604 formed within waveguide block 602. FIG. 11 also depicts encasement 802 which may surround waveguide block 602.

Figure 12:
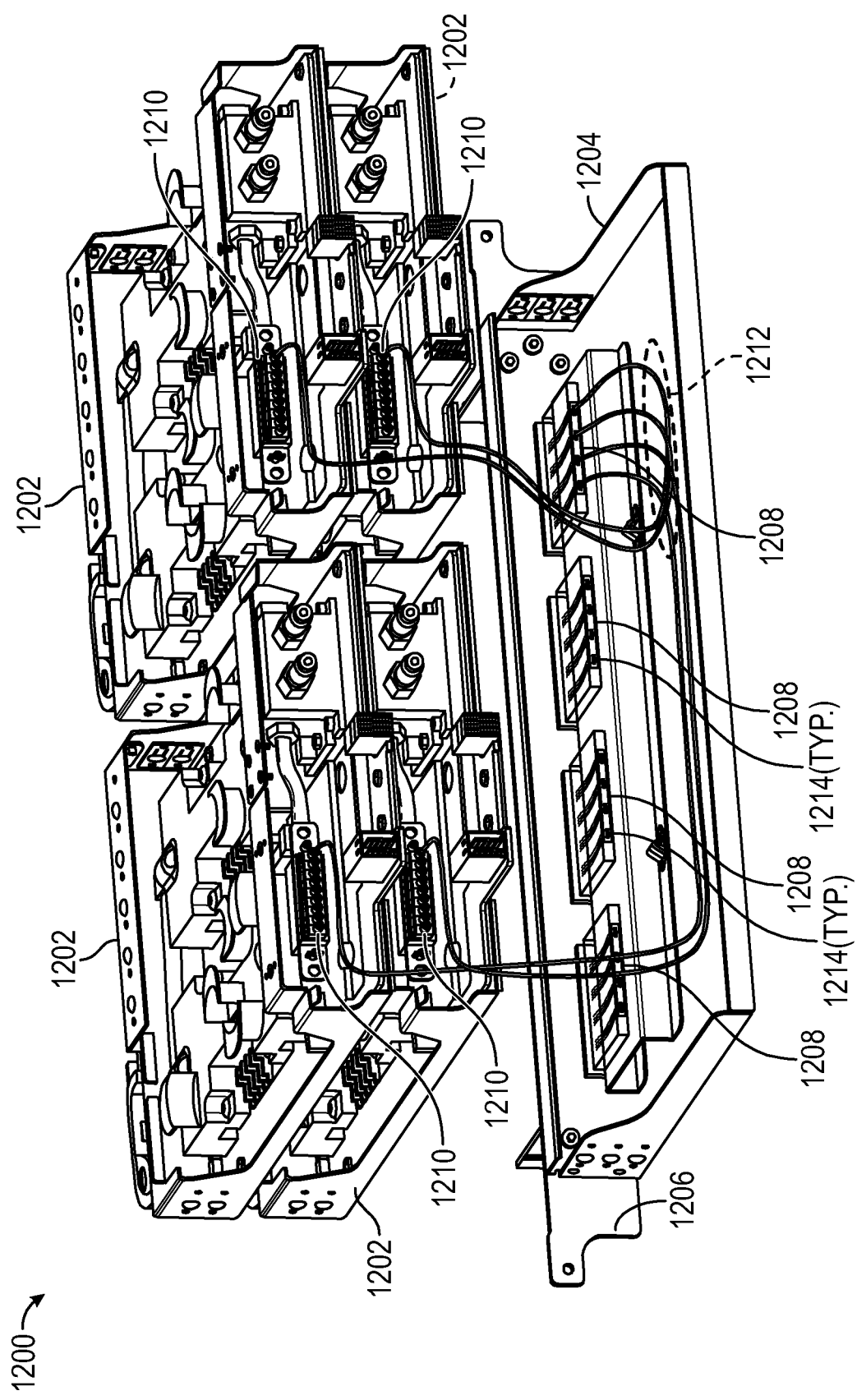
FIG. 12 is a perspective view of an optical switching system in accordance with one example.

FIG. 12 is a perspective view of a rack installation of an optical switching system 1200 including a plurality of line card units 1202 and a chassis shuffle tray 1204 according to one example. Chassis shuffle tray 1204 includes a faceplate 1206 in which are mounted a plurality of chassis waveguide shuffle blocks 1208. Each line card unit 1202 includes a line card waveguide shuffle block having a blindmate connector 1210. A plurality of optical fiber arrays 1212 are shown in FIG. 12 coupled between V-grooves 1214 of chassis shuffle blocks 1208 and blindmate connector 1210 of a line card unit 1202.

Figure 13:
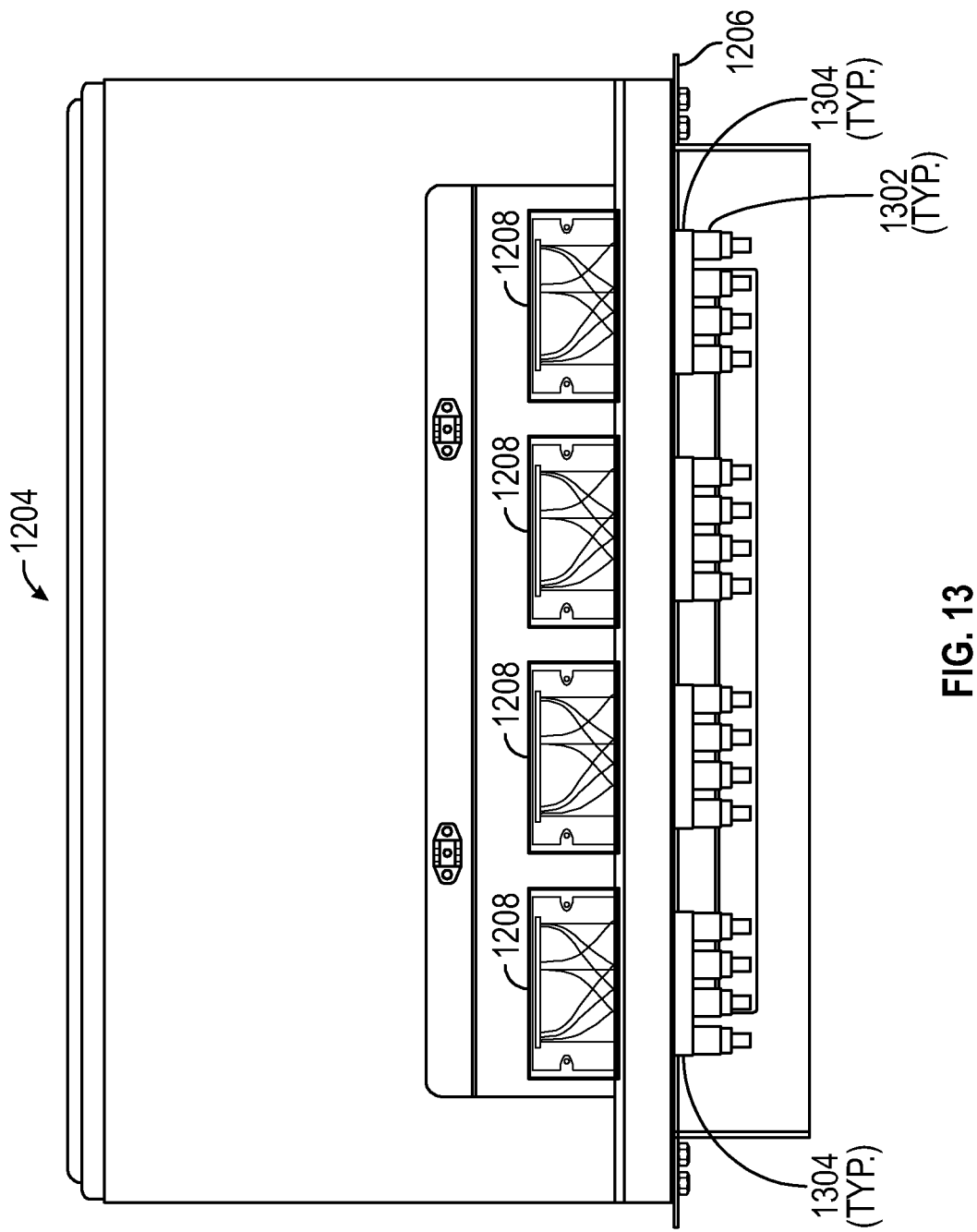
FIG. 13 is a top view of a chassis shuffle tray from the optical switching system in the example of FIG. 12.
Figure 14:
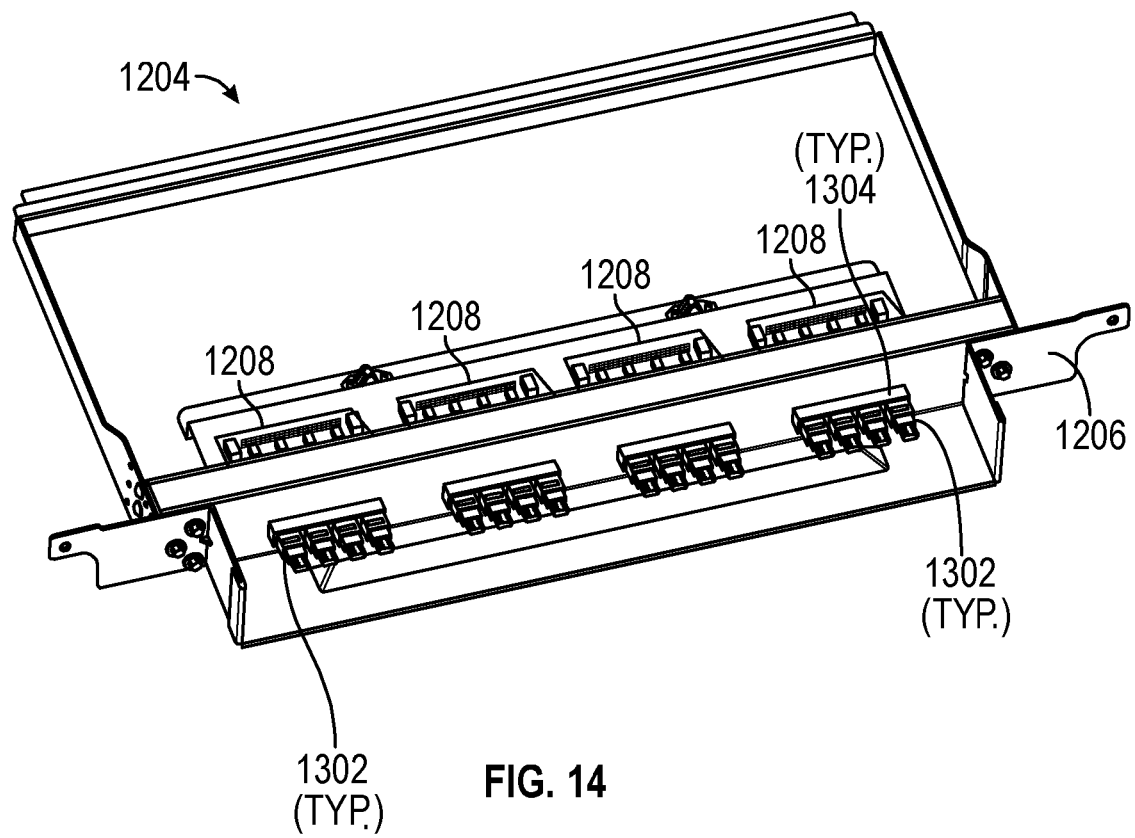
FIG. 14 is a perspective view of the chassis shuffle tray in the example of FIG. 13.

FIGS. 13 and 14 are top and perspective views, respectively, of chassis shuffle tray 1204 from the example of FIG. 12. As shown in FIGS. 13 and 14, a plurality of MPO plug connectors 1302 are engaged in corresponding MPO receptacle connectors 1304 of a plurality of chassis waveguide shuffle blocks 1208 through faceplate 1206.

Figure 15:
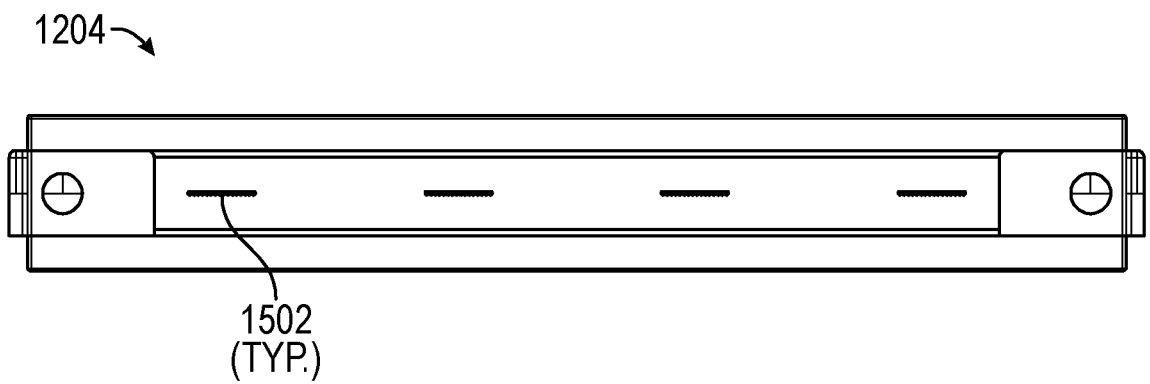
FIG. 15 is a view of the chassis shuffle tray in the example of FIG. 13.

FIG. 15 is a view of chassis shuffle tray 1204 from the example of FIG. 12. As shown in FIG. 15, a plurality of V-grooves 1214 are provided for connection of chassis shuffle block 1208 on waveguide shuffle tray 1204 to individual line card units (not shown in FIG. 15).

Figure 16:
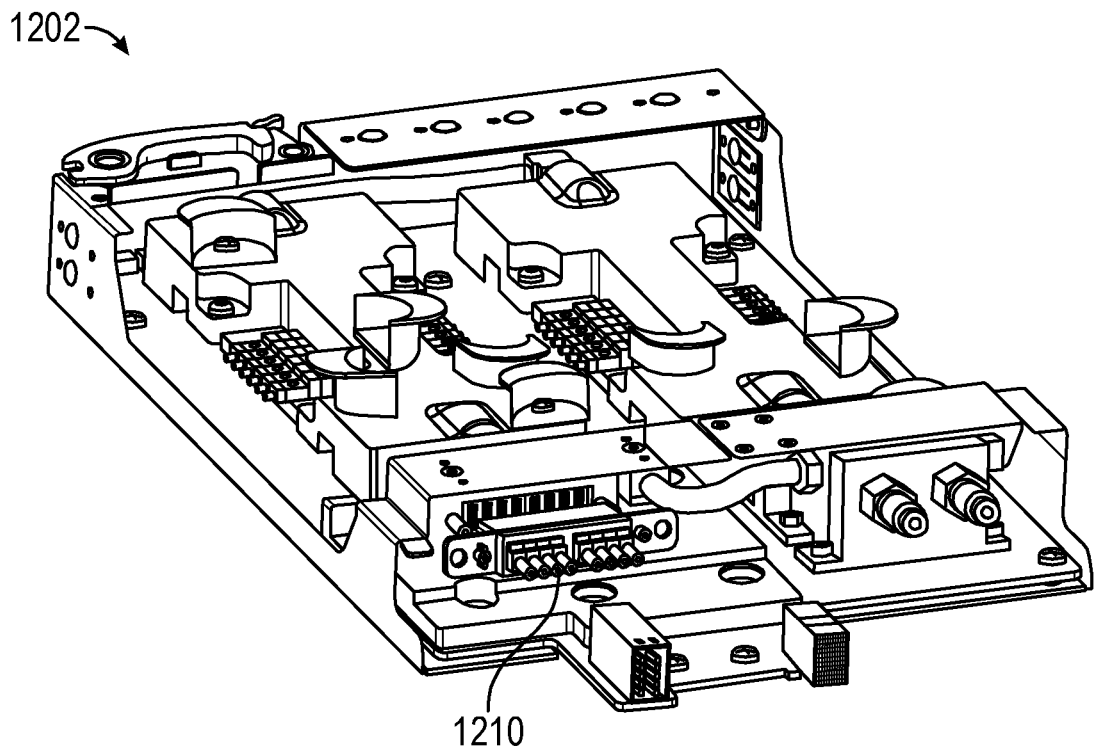
FIG. 16 is a perspective view of a line card unit in the optical switching system in the example of FIG. 12.
Figure 17:
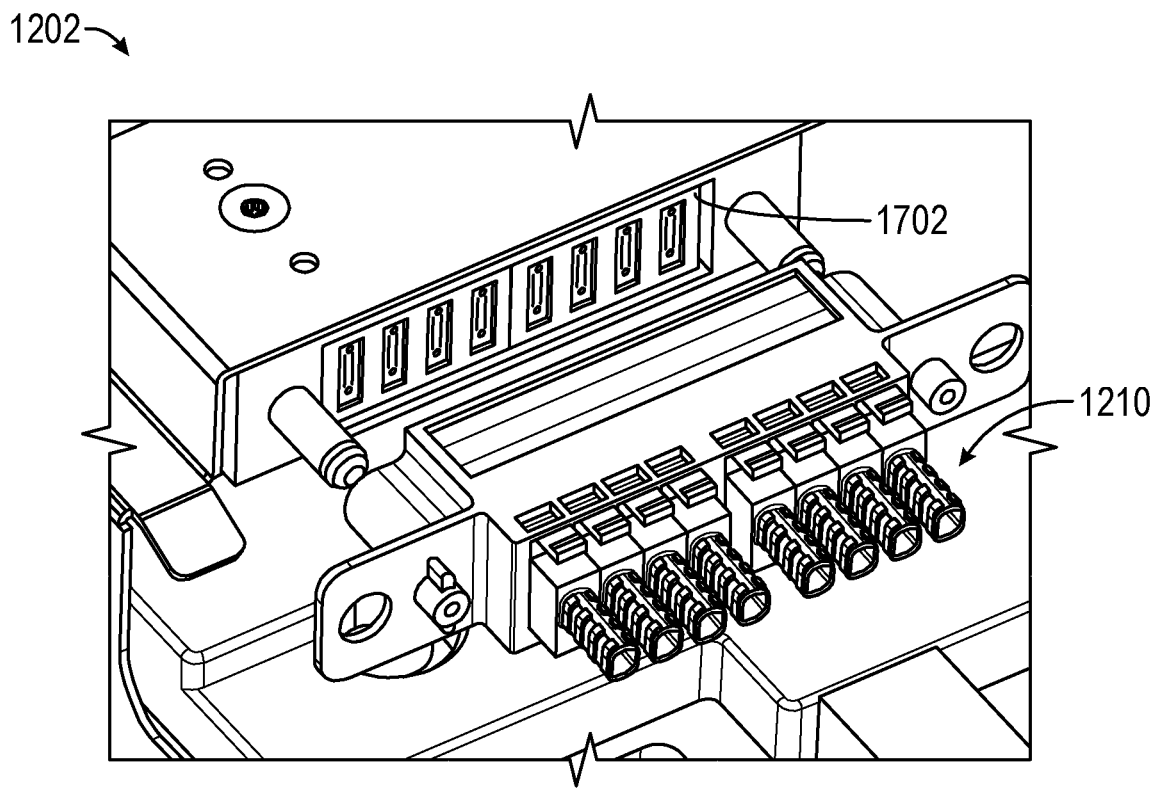
FIG. 17 is a perspective detail view of the line card unit in the example of FIG. 16.

FIG. 16 is a perspective view of a line card unit 1202 from the example of FIG. 12 and FIG. 17 is an enlarged view of a portion of line card unit 1202. As shown in FIGS. 16 and 17, line card unit 1202 includes a line card waveguide shuffle block 1702. Line card waveguide shuffle block 1702 opto-mechanically couples to blindmate connectors 1210. Blindmate connectors 1210 are terminated on the ends of fiber cables 1212 (as shown in FIG. 12, but not shown in FIGS. 16 and 17) that are also terminated to chassis shuffle tray 1204 on the other end as shown in the example of FIGS. 13-15.

In examples herein, complexity and thus space and cost expenses to shuffle fiber strands are eliminated by replacing them with waveguide shuffle blocks. Waveguide blocks may be contained within chassis and line cards that can be blindmated. Waveguide blocks may have end faces to allow external cable mating and/or blindmating, eliminating individual ferrules on one mating side, consequently reduce space and costs. In the examples shown, waveguide shuffle blocks are interconnected with straight fiber ribbons to simplify system designs and allow scalability with minimum space and ease to manufacture as well as install/service.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A shuffle assembly for a computing device, comprising:
   at least one chassis waveguide shuffle block having a plurality of chassis inputs and a plurality of chassis outputs, and having a plurality of optical waveguides formed therein connecting the chassis inputs to the chassis outputs in a chassis shuffle arrangement; and
   at least one line card shuffle unit having a plurality of line card inputs, at least one of the plurality of line card inputs, a plurality of line card outputs, and a plurality of connections therein connecting the plurality of line card inputs to the plurality of line card outputs in a line card shuffle arrangement; and
   at least one optical cable coupling the at least one chassis waveguide shuffle block to the at least one line card shuffle unit.

2. The shuffle assembly of claim 1, wherein the at least one optical cable comprises an optical fiber ribbon cable.

3. The shuffle assembly of claim 1, wherein the at least one chassis waveguide shuffle block comprises a cascaded stack of at least two waveguide blocks having waveguides formed therein.

4. The shuffle assembly of claim 3, wherein the at least two waveguide blocks are connected by an inter-block interface coupling at least one waveguide in a first waveguide block to a waveguide in a second waveguide block.

5. The shuffle assembly of claim 4, wherein the inter-block interface comprises an interface pin on the first waveguide block and an interface socket on the second waveguide block.

6. The shuffle assembly of claim 1, wherein the at least one line card shuffle unit comprises a line card shuffle block having a plurality of waveguides formed therein.

7. The shuffle assembly of claim 6, wherein the line card shuffle block comprises a monolithic glass block.

8. An optical switching system for a computing device, comprising:
- a chassis shuffle tray including at least one chassis waveguide shuffle block, the chassis shuffle tray having at least one input connector coupled to the at least one chassis waveguide shuffle block and at least one output connector coupled to the chassis waveguide shuffle block for connecting to an optical cable, the at least one input connector for receiving a plurality of optical input signals;
- at least one line card, comprising:
    - at least one line card input coupled to the at least one output connector of the chassis shuffle tray by the optical cable;
    - at least one line card shuffle unit coupled to the line card input and having at least one output;
- wherein the chassis waveguide shuffle block performs a chassis shuffle of the plurality of optical input signals between the at least one input connector and the least one output connector;
- and wherein the line card shuffle unit performs a desired line card shuffle of optical signals between the at least one line card input and the at least one line card shuffle unit output.

9. The optical switching system of claim 8, wherein the optical cable comprises an optical ribbon cable.

10. The optical switching system of claim 8, wherein the at least one chassis waveguide shuffle block comprises at least one monolithic glass block having a plurality of three-dimensional waveguides formed therein.

11. The optical switching system of claim 10, wherein the at least one chassis waveguide shuffle block plurality of glass blocks arranged in a stack, each of the plurality of glass blocks having at least one waveguide formed therein.

12. The optical switching system of claim 11, further comprising at least one inter-block interface between adjacent waveguide blocks in the stack.

13. The optical switching system of claim 12, wherein the at least one inter-block interface between adjacent waveguide blocks in the stack connects a waveguide in a first waveguide block to a waveguide in an adjacent waveguide block.

14. The optical switching system of claim 8, wherein the line card shuffle unit comprises a line card waveguide shuffle block having a plurality of waveguides formed therein.

* * * * *